3,265,710
SOLVENTS EXTRACTS CONTAINING
THIOPHENE GROUPS
George W. Ayers, Chicago, and William A. Krewer, Arlington Heights, Ill., assignors, by mesne assignments, to Union Oil Company of California, Los Angeles, Calif., a corporation of California
No Drawing. Filed Dec. 26, 1961, Ser. No. 162,203
The portion of the term of the patent subsequent to Mar. 10, 1981, has been disclaimed
2 Claims. (Cl. 260—330.5)

This invention relates primarily to a new composition of matter comprising complex, high-molecular-weight, polynuclear, aromatic, alkylaromatic, heterocyclic, mono-, di-, or polyamines derived from solvent extracts obtained in the solvent extraction of mineral lubricating oils. More specifically, this invention relates to mono-, di- or polyamines or mixed mono-, di- or polyamines and their salts of the formulae, (I) 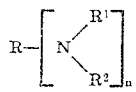

(II) 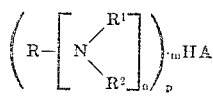

wherein R is a radical derived from any of the complex, high-molecular-weight, polynuclear, aromatic, alkylaromatic, and/or heterocyclic compounds present in the reactable portion of solvent extracts obtained in the solvent extraction of mineral lubrication oils, $R^1$ and $R^2$ are the same or different radicals of the group consisting of hydrogen, alkyl, cycloalkyl, aryl, alkaryl, aralkyl, and heterocyclic radicals, as hereinafter more fully defined, and $n$ and $p$ have a value of 1 to 3 and preferably 1 to 2, $m$ has a value of 1 to 3 and may be equal to or less than $p$, and HA represents any acid, including hydrohalic, mineral and organic acids as hereinafter defined.

A feature of this invention is the discovery that compounds of the foregoing Formulae I and II are corrosion inhibitors and are particularly useful in mitigating the corrosion or solution of metals in acid media.

Certain substances, when dissolved in aqueous solutions of mineral acids, are known to inhibit the corrosion or solution of metals by the acidic solution. It is thought that such inhibitors are adsorbed on the surface of the metal, passivating it and preventing, or retarding, the acidic solution from corroding or dissolving the metal. For example, a number of materials, including amines, are known to inhibit the attack of steel by acids.

Now, in accordance with this invention, we have discovered that the mixed amines prepared from solvent extracts inhibit the attack of steel by dilute solutions of acids, such as sulfuric acid. For example, we have demonstrated that the mixture of amines which we have prepared from solvent extracts obtained in the refining of mineral lubricating oils effectively reduces the corrosion of steel by dilute sulfuric acid. While the composition of the amine mixture prepared from lube oil extracts is very complex, and consequently not known completely, the amines undoubtedly contain condensed aromatic nuclei because the extracts are largely composed of complex aromatic compounds, particularly compounds containing condensed nuclei.

The compositions of this invention may be prepared by several methods. Using RH as the formula for the complex, reactive, high-molecular-weight, polynuclear, aromatic alkylaromatic and/or heterocyclic compounds present in solvent extracts, it has been found that the following reactions may be used:

(1) $RH + H_2SO_4 \longrightarrow RSO_3H + H_2O$ or $RH + SO_3 \longrightarrow RSO_3H$ $RSO_3H + NaOH$ (and/or KOH) $\longrightarrow$
$RSO_3Na$ (and/or $RSO_3K$) $+ H_2O$ or $2RSO_3H + Na_2CO_3$ (and/or $K_2CO_3$) $\longrightarrow$
$2RSO_3Na$ (and/or $2RSO_3K$) $+ H_2O + CO_2$ $RSO_3Na$ (and/or $RSO_3K$) $+ NaOH$ (and/or $KOH$) $\xrightarrow{\text{fusion}}$
$RONa$ (and/or $ROK$) $+ H_2O$ $RONa$ (and/or $ROK$) $+ H^+ \longrightarrow ROH + Na^+$ (or $K^+$)

$ROH + NH_3 \xrightarrow{(NH_4)_2SO_3} RNH_2 + H_2O$ (2) $RH + HNO_3 \longrightarrow RNO_2 + H_2O$ $RNO_2 + 6H \xrightarrow{\text{reduction}} RNH_2 + 2H_2O$ (3) $RH + Cl_2 \longrightarrow RCl + HCl$ $RCl + NaNH_2 \xrightarrow{\text{liq. } NH_3} RNH_2 + NaX$ Any of the foregoing methods of amine preparation from a hydrocarbon may be used to prepare the amines of this invention. The reaction conditions such as temperature and pressure, ratios of reactants. etc., are well-known in this art and need not be further elucidated. The reaction or method has been found to produce highly effective results in relation to the preferred starting material, RH, namely solvent extracts, and will be used to illustrate the process of this invention.

A preferred source material for the reaction comprises the well-known by-product solvent extracts of mineral lubricating oils. These so-called solvent extracts are adequately described as those aromatic materials separated from mineral lubricating oils and their fractions, i.e., those aromatics obtained in the manufacture and refining of neutral oils and bright stocks during treatment with a selective solvent designed to extract the predominantly aromatic materials from the more paraffinic materials. Solvent extracts resulting from the treatment of mineral lubricating oils for the purpose of separating non-aromatic hydrocarbons (the raffinate and finished oil) from the aromatic hydrocarbons and heterocyclics (the extract and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent and may be black in color. The deasphalted oil may have an API gravity of 21.5° to 21.8°, viscosity SUS 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light and a heavy lubricating distillate. The vacuum residue was an oil having a viscosity of 1251 SUS at 210° F., 2.2 percent total sulfur, and an API gravity of 12.6. After propane-deasphalting, the oil had a viscosity of 174 SUS at 210° F. and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction products used in accordance with this invention, for example, liquid sulfur dioxide, nitrobenzene, Chlorex, chlorophenol, cresylic acid, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

The solvent extracts from lubricating oils used as starting materials for this invention have the following general properties and characteristics:

TABLE II

| Characteristics: | Range of value |
|---|---|
| Gravity, ° API | 7.0–18.3 |
| Specific gravity, 60° F./60° F. | 0.945–1.022 |
| Viscosity SUS @ 210° F. | 40–1,500 |
| Viscosity index | −128–+39 |
| Pour point (max.), ° F. | +20–+100 |
| Molecular weight, average | 300–750 |
| Boiling point, ° F. | Above 600 |
| Total sulfur, percent wt. | 0.5–4.5 |
| Sulfur compound, percent v. | 5–45 |
| Aromatic hydrocarbons, percent v. | 25–90 |
| Av. No. of rings/mean arom. mol. | 1.7–3.5 |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of high viscosity index neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and sulfur compounds in the range of 70–95%, the remainder being principally saturates, or material behaving as saturates, together with a minor proportion of from 0.5 to 6.0% of organic acids. The organic acids present are not susceptible to extraction by the use of aqueous strong caustic because of the solubilities of the salts of the acids in the oil. Very little, if any, asphaltic material is present in solvent extracts and they contain no materials volatile at room temperatures.

The materials shown in Tables I and II are merely illustrative and the invention is not to be limited thereby.

It is apparent that the composition and characteristics of the amines will vary somewhat depending on the concentration and types of polynuclear aromatic compounds and heterocyclics in the solvent extracts used. In such

TABLE I

*Sources and physical characteristics of solvent extracts*

| Ext. No. | Crude Source | Solvent | API Grav. | Vis/100° F. secs. | Vis/130° F. secs. | Vis/210° F. secs. | V.I. | Pour, ° F. | Flash, ° F. | Fire, ° F. | C.R., percent | Total Sulfur, percent |
|---|---|---|---|---|---|---|---|---|---|---|---|---|
| 1 | East Tex | Phenol | 11.1 | 23,319 | 4,750 | 282 | −40 | +55 | | | 7.2 | 2.60 |
| 2 | do | do | 15.4 | 15,000 | | 285 | +39 | | | | | |
| 3 | do | do | 12.6 | 36,410 | 4,310 | 310.1 | −1 | +80 | | | 4.7 | 2.27 |
| 4 | do | do | 14.6 | 19,500 | 4,305 | 313 | +27 | +90 | | | 4.7 | 2.2 |
| 5 | do | do | 15.4 | 32,500 | | 372 | +5 | +60 | | | 4.13 | 2.33 |
| 6 | do | do | 13.7 | 25,000 | 5,400 | 355 | +27 | +80 | | | | 2.18 |
| 7 | do | do | 8.6 | 145,000 | 19,000 | 616 | 0 | +70 | | | | |
| 8 | do | do | 10.5 | 12,676 | 2,514 | 172.1 | −101 | +60 | | | | 2.18 |
| 9 | Santa Fe Springs | do | 10.2 | | | 371 | | +65 | 520 | 600 | | |
| 10 | Texas | Furfural | 13.0 | | | 1,500 | | +85 | 470 | 515 | | |
| 11 | Penn | Chlorex | 12.2 | | | 1,365 | | +85 | 560 | 630 | | |
| 12 | Penn | Nitrobenzene | 10.0 | | | 1,500 | | +75 | 555 | 640 | | |
| 13 | Mid-Cont | Propanecresol | 14.4 | | | 1,500 | | +100 | 540 | 605 | | |
| 14 | do | Phenol | 13.6 | | | 41.7 | −82 | +20 | | | | |
| 15 | do | Chlorex | 13.6 | | | 200 | −61 | +75 | | | | |
| 16 | do | Phenol | 8.9 | | | 569 | | +75 | | | | |
| 17 | do | Furfural | 14.9 | | | 50.2 | 25 | +20 | | | | |
| 18 | East Tex | Phenol | 13.5 | 25,000 | | 341 | 17 | +65 | 530 | 610 | 5.76 | 2.36 |
| 19 | do | do | 11.1 | 1,054 | 331 | 61.5 | −56 | +40 | 435 | 475 | 0.42 | 2.7 |
| 20 | do | do | 13.7 | 26,000 | 5,615 | 360 | +25 | +65 | 550 | 630 | 5.5 | 2.3 |
| 21 | do | do | 7.7 | 2,007 | 611 | 71.1 | −128 | +35 | 420 | 495 | 0.86 | 3.2 |
| 22 | do | do | 7.3 | 230,000 | 20,800 | 796 | −76 | +65 | 520 | 610 | 7.7 | 3.0 |
| 23 | do | do | 17.6 | 154 | 80 | 41 | 11 | +30 | 400 | 435 | 0.1 | 2.0 |

Extract No. 19 was obtained in the production of 170 Vis High VI neutral, had an average molecular weight of 340, contained 87.0% aromatics, and 13% saturates, and averaged 2.7 aromatic rings per aromatic molecule. Its ultimate analysis was: 86.4% carbon, 10.7% hydrogen.

Extract No. 20 was obtained in the production of 150 Vis High VI Bright Stock, had an average molecular weight of 590, and contained 86% aromatics, 14% saturates, and averaged 3.3 aromatic rings per aromatic molecule. Its ultimate analysis was: 86.2% carbon, 11.4% hydrogen.

Extract No. 21 was obtained in the production of 200 Vis Low VI neutral, had an average molecular weight of 340, and contained 87% aromatics and 13% saturates.

Extract No. 22 was obtained in the production of 160 Vis Low VI Bright Stock, and contained 92% aromatics and 8% saturates.

Extract No. 23 was obtained in the production of 85 Vis neutral, had an average molecular weight of 300, and contained 76.8% aromatics (by the silica gel procedure).

complicated mixtures as solvent extracts from lubricating oil fractions, the content of aromatic materials may vary from about 25% to 90% weight.

In using the preferred source material, namely, solvent extract oils, it is to be understood that the invention is broadly applicable to any petroleum fraction which contains reactable polynuclear aromatic compounds and heterocyclics designated herein as $RH_n$. These types of complex aromatic compounds and heterocyclics are found in high concentrations in solvent extracts obtained in the manufacture of neutrals and bright stocks, all of which materials are to be understood as suitable starting materials. For economic reasons only, those petroleum fractions or solvent extracts containing at least about 20% by wt. of available $RH_n$ compounds are preferred.

It is to be understood that the invention is particularly applicable to any solvent extract from the refining of mineral lubricating oils for the purpose of separating nonaromatic and aromatic materials, that is, where the solvent exerts a preferential selectivity for the non-paraffinic constituents. The exacts are substantially freed of solvent, e.g., phenol extracts are dephenolized by steam stripping, so that they contain practically no solvent.

The invention is illustrated by the following non-limiting example:

*Example I*

A solution of 20 grams of extract No. 19 of Table I in 50 cc. of n-heptane was stirred mechanically for 30 minutes at room temperature with 15 grams of concentrated sulfuric acid. The heptane was decanted from the black, tarry, sulfonated mixture, which was then neutralized with granular sodium carbonate containing a little water. The sodium sulfonate thus obtained was fused with sodium hydroxide for 15 minutes at 626° F., and the solid fusion product was boiled with water. After filtration, the solution was concentrated by boiling, acidified with concentrated hydrochloric acid, and extracted with ether. The ether layer was separated and the ether was removed by evaporation, leaving a solid product composed of phenolic compounds. The mixture of solid phenolic compounds was heated in a closed bomb at 205° F. for 4 hours with an excess of ammonia and ammonium sulfite solution. The resulting solution was acidified with concentrated hydrochloric acid, and the amines were precipitated by the addition of sodium hydroxide. The precipitated amines were removed by filtration and allowed to dry in the air, the yield of brownish-black solid product (amines) being 0.3 gram from 20 grams of extract.

Twenty cc. of 15% sulfuric acid was placed in each of two 30 cc. beakers, and approximately 0.15 g. of the above amine product was added to the acid in one of the beakers. When polished steel strips were placed in the acid contained in each of the beakers, the strip in the uninhibited acid was attacked at once. After 2 hours contact of the metal with the acid solution, the loss in weight of the steel strip in the uninhibited acid solution was 5.7%, while that of the steel strip in the acid containing the amines was 3.1%, thereby demonstrating the effectiveness of the mixture of amines prepared from solvent extracts as a corrosion inhibitor.

*Example II*

A solution of 30 g. of extract No. 19 in 60 cc. of n-hexane is stirred mechanically for one hour at about 80° F. with 20 g. of concentrated sulfuric acid. The hexane is decanted from the sulfonated mixture and granular sodium carbonate, mixed with sufficient water to make a slurry, is added slowly to bring about neutralization. The resulting sodium sulfonate salt is fused with an excess (over stoichiometric) amount of sodium hydroxide for 20 minutes at a temperature of 650° F., forming a solid fusion product. The solid product is boiled with water, and the mixture is filtered to produce a filtrate which is concentrated by boiling and then acidified by the addition of concentrated hydrochloric acid. The resulting neutralized product is extracted with about 4 separate 50-cc. portions of ether. The ether layers are combined, and ether is removed by evaporation, leaving a solid product. The mixture of solid phenolic compounds so produced is heated in a closed bomb at about 210° F. for about 6 hours with an excess of ammonia, and ammonium sulfite solution having a concentration of about 10% by volume of ammonium sulfite. The resulting solution is acidified with concentrated sulfuric acid and the amines so produced are precipitated by the addition of 10% sodium hydroxide. The precipitated amines are removed by filtration and allowed to dry in the air at room temperature. The yield of brownish-black solid polyamine product is about 0.8 g. per 30 g. of extract.

About 70 cc. of 10% sulfuric acid is placed in each of two 4-oz. bottles and approximately 0.20 g. of the foregoing polyamine product is added to the acid in one of the bottles. Polished steel strips, measuring about 2 inches by ½ inch by 1/16 of an inch, are placed in the acid contained in each bottle so that the strips are completely immersed in the acid solution. The strip that is immersed in the uninhibited acid undergoes immediate attack and corrosion. After 1 hour contact of the material with the solution, the loss in weight of steel strip in the uninhibited acid solution is about 4% while that of the steel strip in the acid containing the polyamine of this example is about 1%. This demonstrates the effectiveness of the mixed polyamines prepared from solvent extracts as corrosion inhibitors.

*Example III*

To 50 grams of extract No. 19 (Table I) was added 100 grams of concentrated nitric acid. The mixture was warmed and stirred mechanically for four hours until no more oxides of nitrogen were liberated from the mixture. After the mixture had been washed three times with water, the nitro compounds were reduced to amines by warming for twenty hours with 90 grams of stannous chloride and 160 cc. of concentrated hydrochloric acid. For isolation of the complex amines, the mixture after reduction is made strongly alkaline with sodium hydroxide solution and extracted with four 50 cc. portions of ether, after which the ether washings are combined, washed twice with water, then treated with gaseous hydrogen chloride to precipitate the complex amines as hydrochlorides. Approximately 0.9 gram of brown complex amine hydrochlorides is obtained. Corrosion tests with two steel strips as described in Example 2, show 3.5% weight loss in the uninhibited acid as compared to 1.8% weight loss in the inhibited acid. This demonstrates the effectiveness of the complex amines as corrosion inhibitors.

*Example IV*

Chlorine is passed into 50 grams of extract 21 (Table I) until there is a gain in weight of 4.1%. A ten gram sample of this chlorinated extract is heated in a closed steel bomb at 150° C. with 20 grams of sodamide and 50 cc. of liquid ammonia for six hours. After venting the ammonia from the bomb, the contents are removed and heated with water. After removal of the aqueous layer, 100 cc. of n-heptane is added and the complex amines precipitated with gaseous hydrogen chloride. Approximately 0.6 gram of brown complex amine hydrochloride product is obtained from the ten grams of chlorinated extract.

The amines which are prepared in accordance with this invention are amines or mixtures of amines in which amino groups replace one to three hydrogen atoms of the molecules of high-molecular-weight, polynuclear, aromatic, alkylaromatic and/or heterocyclic reactive portion of the solvent extracts. These high-molecular-weight, polynuclear, aromatic, alkylaromatic and/or heterocyclic reactive compounds are primarily naphthalenic, phenanthrenic, anthracenic and thiophenic in nature, having one or several (signified by $R^3$) alkyl groups on each aromatic or heterocyclic nucleus. The chain length of the alkyl ($R^3$) substituent side chains on the R radicals as defined herein is usually no greater than about 10. Complex amines containing R' groups such as alkyl group, directly attached to the nitrogen atom may be produced by using alkyl amine instead of ammonia in reaction (1) enumerated previously. Secondary amines of the formula

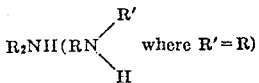

are usually produced simultaneously along with primary amines $RNH_2$ when nitro compounds are reduced with hydrogen. The simplified structures of some of the amine molecule without regard to the position of the alkyl or cycloalkyl groups ($R^3$) are represented by the following formulae:

AMINONAPHTHALENES

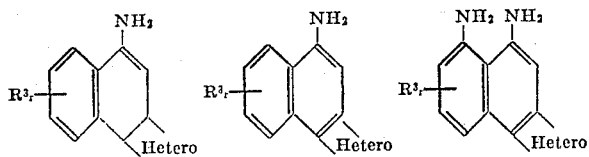

AMINOPHENANTHRENES

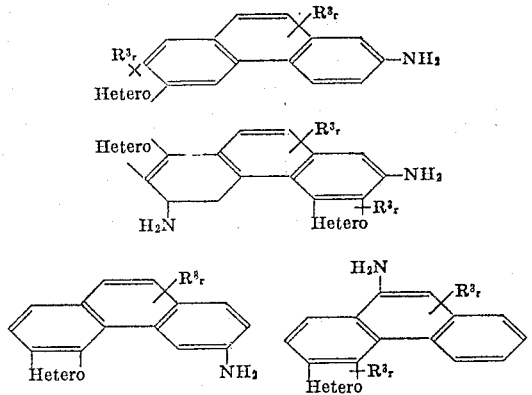

AMINOANTHRACENES

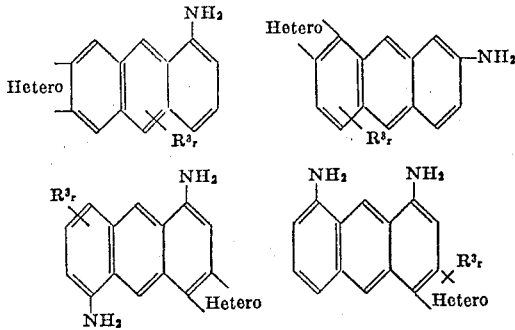

Throughout these formulae $R^3$ may be an alkyl radical or a cycloalkyl radical, $r$ has a value of 1 to 5, the total number of carbon atoms in the $R^3$ groups on any molecule can be from 1 to 22 and the $R^3$ groups can be mixed alkyl and cycloalkyl on any one molecule.

AMINOTHIOPHENES

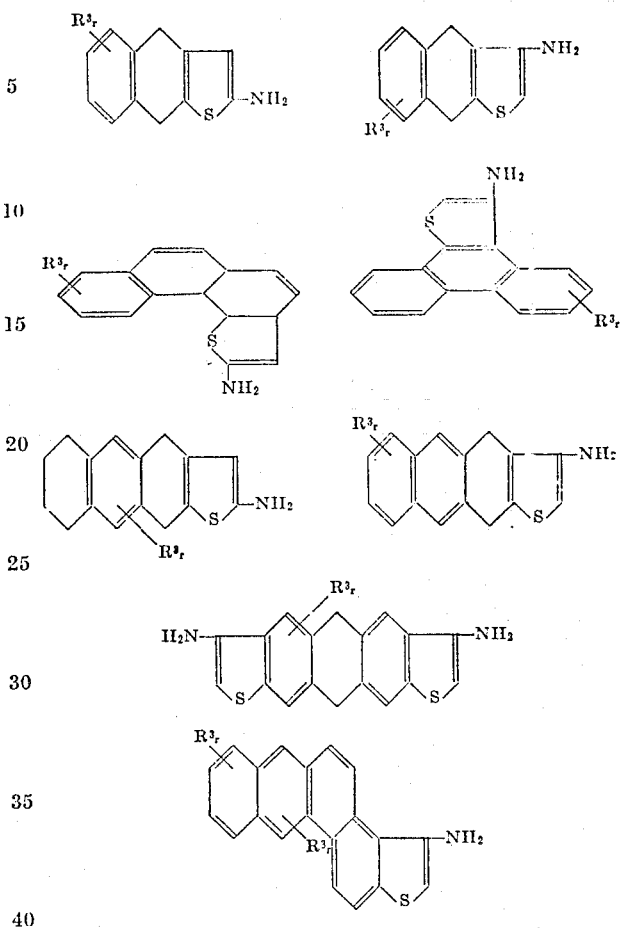

The complex extract amines as obtained by the procedures shown above are brownish solids which are soluble in ether and in n-heptane. They readily form hydrochlorides which are insoluble in ether and in n-heptane. When purified by repeated precipitation from n-heptane with gaseous hydrogen chloride, they are colorless, but deteriorate slowly in the air to brown products. They contain small amounts of aminothiophene derivatives.

The sulfonation step according to method (1) is carried out using the known techniques of the prior art for this reaction. The process of the Amott et al., Patent 2,395,774, dated February 26, 1946, may be used. In this process, the solvent extract oil used in place of the hydrocarbon oil is reacted with sulfuric acid to form a reaction mixture comprising polysulfonic acids dissolved in unreacted solvent extract along with a sludge phase. A sufficient amount of a slurry of an alkaline metal compound is added thereto to adjust the pH of the water phase to within the limits of about 9.5 and 5.0. Following this, a settling step is used to form an upper phase containing the polysulfonates of the solvent extract dissolved in the remaining unreacted solvent extract, and a lower phase containing free water and solids. These phases are separated to recover the upper polysulfonate-containing phase which is treated to alkali fusion to form the polyphenols, followed by subsequent conversion to the polyamines.

The sulfonation may be conducted in accordance with the Vold patent, 2,514,733 dated July 11, 1950, wherein a concentrate of polysulfonates in unreacted solvent extract is prepared by treating the solvent extract with a sulfonating agent comprising sulfuric acid and sulfur trioxide, adding a volatile hydrocarbon solvent to separate the sludge phase, neutralizing the mixture of polysulfonic acids and solvent extract with a metal base, and separating a sulfonate concentrate. The improvements over Amott and Vold, described in the Crosby and Hutchings Patent 2,846,466, dated August 5, 1958, may also be used, employing the technique of two-step neutralization. Likewise, the techniques described in the Hennig and Hutchings patent, 2,802,026, dated August 6, 1957, can be used.

The polysulfonate product from the sulfonate reaction is next treated to a fusion reaction with an alkali metal hydroxide, e.g., sodium hydroxide, potassium hydroxide, lithium hydroxide, or cesium hydroxide, or a mixture of alkali metal hydroxides. This reaction is carried out by mixing the solid alkali with the polysulfonated solvent extract and heating the mixture to a temperature of about 600° to 650° F., for about 10 to 30 minutes. This forms a solid fusion product which is boiled with water for about 10 to 30 minutes to form a solid product which separates from the water phase on cooling. About 60 to 100% by weight of water is used, based on the total weight of polysulfonate to be reacted.

The resulting solution of fused solid product is filtered and concentrated by boiling, then acidified by adding an excess of a mineral acid, e.g., hydrochloric acid, sulfuric acid or phosphoric acid, and the acidified solution is extracted with a solvent such as ether. The ether layer (or layers were multi-extractions are used) is separated, and the ether evaporated on the steam bath.

The solid product produced from the evaporation step is next heated in a pressure container or closed bomb at a temperature of about 190° to 250° F. for about 2 to 8 hours with an excess of ammonia and ammonium sulfite solution. The resulting liquid product is next acidified with a mineral acid and the polyamine products are precipitated by the addition of an alkali. The precipitated amines are filtered and air dried.

The compounds of this invention may exist and be used in the form of the free amine (Formula I) or in the form of amine salts (Formula II), corresponding to the salts of ammonia. The invention is directed to both the free amines and the amine salts. Such salts include the hydrohalide salts e.g., salts formed with hydrochloric, hydrogromic, hydroiodic and hydrofluoric acid; and such salts as acetate, aminosulfamate, arsenate, benzenesulfonate, benzoate, borate, bromate, phosphate, chlorate, chromate, dichromate, citrate, cyanate, cyanide, formade, lactate, laurate, molybdate, nitrate, oleate, oxalate, palmitate, metaphosphate, orthophosphate, and picroamate, picrate, propionate, salicylate, stearate, succinate, thiocyanate, valerate and mixed salts with metals such as aluminum sulfate, chromium sulfate and the like.

The compounds have a demonstrated utility as corrosion inhibitors for which purpose they are effective in small amounts, in the order of about 0.1 to 5.0 wt. percent. This utility is particularly pronounced in acid media of any strength ranging from very dilute to concentrated acid solutions, including the known mineral and stronger organic acids. The only prohibition on this use is that the medium does not change the complex amines of this invention to a form which does not function as a corrosion inhibitor.

The compounds of this invention may be used in neutral media and are particularly effective in aqueous media containing acid-forming bodies or substances susceptible to oxidation to acids which are corrosive, such as neutral aqueous media containing hydrolyzable salts or aerated aqueous solutions containing acid-producing substances. Some of the salt forms of the complex amines may not be water soluble in which event they are used in suspension or with a suspending agent. The compounds of this invention may be used in alkaline media or aerated aqueous alkaline solutions.

The corrosion inhibitors of this invention are used in the same manner as prior art corrosion inhibitors to protect metal surfaces in contact with a corrosive environment. The metal surfaces to be protected may be ferrous metals, alloys, plated metals, tin, iron, steel aluminum, copper, various bearing metals or alloys, castings, machine parts and the like. One particular application lies in the protection of metals in contact with commercial detergent compositions and compositions containing emulsifiers, ordinary soaps, modern detergents and the like, particularly under aeration conditions.

Examples of such synthetic detergents and emulsifiers that can be present in the aqueous environments to be protected by the corrosion inhibitors of this invention are dodecylbenzene sulfonic acid, salts of fatty acid derived tertiary amines, alkylaryl sulfonates, alkylaryl sulfonates having molecular weights of 465 to 480, alkylaryl polyether alcohols, polyglycol esters, disodium N-octadecylsulfosuccinamate, tetrasodium N-(1,2-dicarboxyethyl)-N-octadecylsulfosuccinamate, sodium diamyl sulfosuccinic acid, ethanolated alkyl guanidine amine complexes, sodium isopropyl naphthalene sulfonate, alkali metal petroleum sulfonates, alkaline earth metal petroleum sulfonates, fatty amines, blends of alkaline compounds and detergents, polyoxylethylated nonylphenols, polyoxylalkylene esters and sulfonates, and the like, which are either of anionic, nonionic or cationic type. These detergents and emulsifiers are used in textile processing, electroplating, car washing, metal pickling, grease emulsifiers, emulsion paints, adhesives, cleaning compositions, dishwashing compositions, and the like. The corrosion inhibitors of this invention find application in the preparation, handling, and use of these types of detergent compositions.

Accordingly, this invention contemplates non-corrosive fluent mixtures of a solvent or liquid and the corrosion inhibitors disclosed herein or fluent mixtures of a detergent in a solvent or liquid and the corrosion inhibitors and also solid or semi-solid compositions such as soaps and greases. The fluent mixtures can be in the form of solutions, suspensions or concentrates containing a small amount, a soluble amount or a suspendible amount of the corrosion inhibitors.

Solvents or liquids which are inert as regards any reactivity toward the corrosion inhibitors but which exhibit a corrosive action to metal under the conditions of use may include water, liquid hydrocarbons, lubricating oils, bright stock, solvent extracts from the solvent refining of mineral lubricating oils, naphthast kerosene, gasoline, grease, vegetable, animal and fish oils, synthetic esters, cleaning solvents and the like, containing or not containing detergents, emulsifiers or other addends. Between about 0.1 to 5.0 wt. percent, depending on the particular amino compound, salt or fraction thereof used, or any effective amount over or under these limits, is used for solutions, suspensions or concentrates depending on the nature of the carrier composition, solid, semi-solid or liquid used therewith and the solubility or suspendability of the corrosion inhibitor therein. The inhibitors of this invention may be dissolved or suspended in an inert solid, semi-solid fluid or fluid composition as a concentrate to be added or incorporated in a final composition by blending, grinding, dilution, etc. Cleaning pads composed of soap or detergent compositions and steel wool, copper mesh or wire mesh are specific examples of solid or semi-solid carrier compositions to which the corrosion inhibitors of this invention can be added.

The invention also contemplates a method of inhibiting the corrosion of metals or alloys in contact with a corrosive fluid (gaseous or liquid) environment by incorporating an effective and corrosion-inhibiting amount of the corrosion inhibitors disclosed herein. The method is carried out by adding or introducing the corrosion inhibitor per se or as a fluent mixture into systems in contact with such corrosive environments. The rate of introduction or the amount of corrosion inhibitor used is varied in accordance with the demands of the system in order to accomplish the intended result.

The alkyl radicals $R^1$ and $R^2$ attached to the nitrogen atom of the polyamines of this invention may contain from 1 to 20 carbon atoms and be aliphatic, cycloaliphatic, aromatic, alkaryl, aralkyl, heterocyclic, naphthyl, anthacenyl and the like. Examples of $R^1$ and $R^2$ groups, which may be the same or different in the molecule are methyl, ethyl, propyl, butyl, isopropyl, isobutyl, t-butyl, amyl, isoamyl, hexyl, isohexyl, heptyl, octyl, nonyl, decyl, hendecyl, dodecyl, tridecyl, tetradecyl, pentadecyl, hexadecyl, heptadecyl, octadecyl, nonadecyl and eicosyl in the aliphatic series. $R^1$ and $R^2$ may be unsaturated aliphatic groups of this series. The alkaryl groups include any of the foregoing aliphatic groups attached to phenyl, naphthyl, anthracenyl and the like aromatic groups such as methylphenyl, ethylphenyl, isopropylphenyl and the like. The aralkyl groups may be phenylmethyl, phenylethyl, phenyloctyl and the like. Such cycloaliphatic groups as cyclopropyl, cyclobutyl, cyclopentyl, cyclohexyl and related groups are intended. The heterocyclic groups may be α-furyl, β-furyl, furfuryl, α-thienyl, β-thienyl, α-pyrrolyl, β-pyrrolyl, α-indolyl, β-indolyl, and oxazolyl. As is known, where $R^1$ or $R^2$ or both are aryl groups the salts thereof do not readily form if water is present.

An aspect of this invention is the amines wherein $R^1$ and/or $R^2$ are R groups in Formula I or II. In this instance any remaining group on the nitrogen is hydrogen for one or more of the

radicals attached to the molecule. Thus compounds of the formulae $R_3N$, $R_2NH$, $RNH_2$, that is, the primary, secondary and tertiary amines, are contemplated, wherein R is the complex radical derived from solvent extracts obtained in the solvent refining of mineral lubricating oils by use of a solvent selective for aromatic compounds. Mixtures of the various amines disclosed herein are likewise contemplated and various fractions thereof which may be separated by known methods.

Another aspect of this invention comprises the phenolic compounds formed in the process of Example I. These compounds have the formula $R(OH)_n$ wherein the hydroxyl groups are attached to the ring carbon atoms as are the amino groups of the primary products of this invention and n has the value of 1 to 3. The phenols are useful as antioxidants in gasoline, in the preparation of chlorinated wax-phenol condensation products to be used as pour-point depressors, to react with hexamethylene tetramine to form resins, to form phenol-formaldehyde resins, to form phenol-acrolein resins, to couple with N-dialkyl-anilines to form azo dyes, and as antiseptics.

The embodiments of the invention in which an exclusive property or privilege is claimed are defined as follows:
1. The amino product produced by the reaction of
    (1) solvent extracts obtained in the solvent extraction of mineral lubricating oils using a solvent selective for aromatic compounds, said solvent extracts being complex, aromatic polynuclear sulfur and nitrogen-containing heterocyclic compounds characterized by having an average molecular weight of about 300 to 750, a combined sulfur content of about 0.9 to 4.5 wt. percent, and an average of about 1.7 to 3.5 aromatic rings per mean aromatic molecule;
    (2) a sulfonating agent at a temperature sufficient to form the sulfonate of said solvent extracts;
    (3) neutralizing said sulfonate product with an alkali metal hydroxide to form the alkali metal sulfonate salt thereof;
    (4) fusing said alkali metal sulfonate salt with an alkali metal hydroxide at a temperature of about 600° F.–650° F. to form the alkali metal aryl oxide form thereof;
    (5) acidifying said alkali-metal aryl oxide with a mineral acid to form the phenolic product and
    (6) heating said phenolic-solvent extract product with ammonia in the presence of ammonium sulfite at about 205° to 210° F. to form the amino-solvent extract product.
2. The amine-hydrochloride product produced by the reaction of
    (1) solvent extracts obtained in the solvent extraction of mineral lubricating oils using a solvent selective for aromatic compounds, said solvent extracts being complex, aromatic polynuclear sulfur and nitrogen-containing heterocyclic compounds characterized by having an average molecular weight of about 300 to 750, a combined sulfur content of about 0.9 to 4.5 wt. percent and an average of about 1.7 to 3.5 aromatic rings per mean aromatic molecule;
    (2) concentrated nitric acid at a temperature sufficient to form the nitro-solvent extract product;
    (3) reducing said nitro-solvent extract product to the amino-form by reaction with stannous chloride and concentrated hydrochloric acid;
    (4) treating the amino-solvent extract product with sodium hydroxide and extracting the complex amino-solvent extract product therefrom with ether and
    (5) treating the ether solution with gaseous hydrogen chloride to precipitate the amine-hydrochloride salt of said solvent extracts.

References Cited by the Examiner

UNITED STATES PATENTS

| | | | |
|---|---|---|---|
| 1,809,207 | 6/1931 | Mayer | 260—330.5 |
| 2,308,690 | 1/1943 | Hughes | 260—329.3 XR |
| 2,410,829 | 11/1946 | Luten | 260—578 |
| 2,528,785 | 11/1950 | Richter et al. | 260—329.3 XR |
| 2,559,677 | 7/1951 | Schroeder et al. | 260—330.5 |
| 2,585,355 | 2/1952 | Szczesny | 260—578 |
| 2,712,531 | 7/1955 | Maguire | 252—392 |
| 2,824,895 | 2/1958 | Luvisi | 260—578 |
| 2,878,191 | 3/1959 | Montgomery | 252—393 |
| 3,124,532 | 3/1964 | Ayers | 260—327 XR |

OTHER REFERENCES

Hartough et al.: Condensed Thiophenes, Interscience Pub. Inc., New York (1954), pages 226, 254 and 255. QD 403 H3c.

WALTER A. MODANCE, *Primary Examiner.*

J. GREENWALD, NICHOLAS RIZZO, *Examiners.*

HERBERT B. GUYNN, JAMES A. PATTEN,
*Assistant Examiners.*